United States Patent
Plofchan

[15] 3,660,840
[45] May 2, 1972

[54] LEVEL INDICATOR DEVICE
[72] Inventor: James Michael Plofchan, 15410 Rockdale Ave., Detroit, Mich. 48223
[22] Filed: May 25, 1970
[21] Appl. No.: 39,970

[52] U.S. Cl. ..................340/421, 33/206 D, 318/489, 340/244 R
[51] Int. Cl. .................................................G01f 23/00
[58] Field of Search ..........33/206 R, 206 B, 206 C, 206 CA, 33/206 D, 206 DL, 206 DT; 340/272, 244 R, 244 A–244 E; 200/84 R, 84 A, 84 B, 84 C, 61.45, 61.52, 85 R; 318/489

[56] References Cited

UNITED STATES PATENTS

| | | |
|---|---|---|
| 3,235,685 | 2/1966 | Litteral..............................200/61.52 |
| 2,910,782 | 11/1959 | Krantz..............................33/206 DL |
| 2,644,332 | 7/1953 | Ulrich...............................200/85 R |

*Primary Examiner*—John W. Caldwell
*Assistant Examiner*—William M. Wannisky
*Attorney*—Barnes, Kisselle, Raisch & Choate

[57] ABSTRACT

A reservoir having a float therein buoyed by a liquid into engagement with a center pivot point. Electrical contacts on the four corners of a cross-shaped member carried by the float are engageable with four associated contacts fixed to the reservoir and each connected to a signal light such that when the reservoir is not level one or more of the lights are energized thereby indicating the direction of inclination of the reservoir.

5 Claims, 7 Drawing Figures

INVENTOR.
JAMES M. PLOFCHAN
BY
Barnes, Kisselle, Raisch & Choate
ATTORNEYS

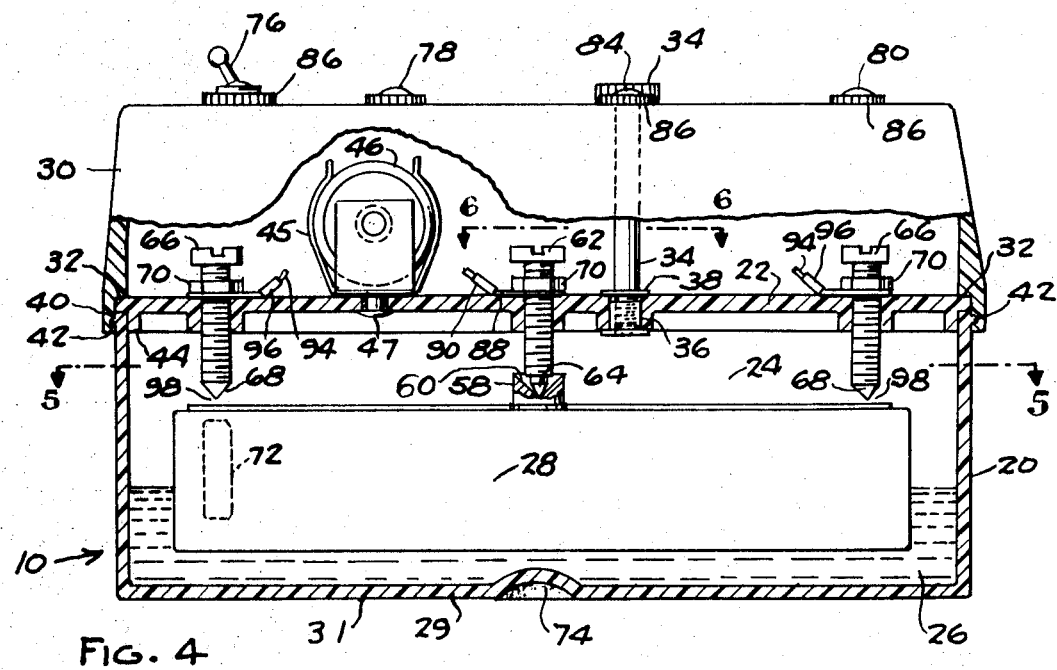
FIG. 4
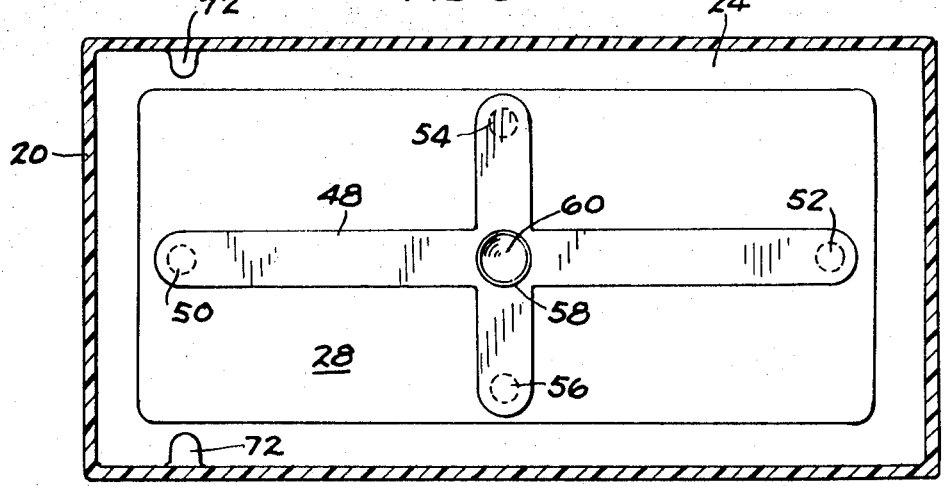
FIG. 5
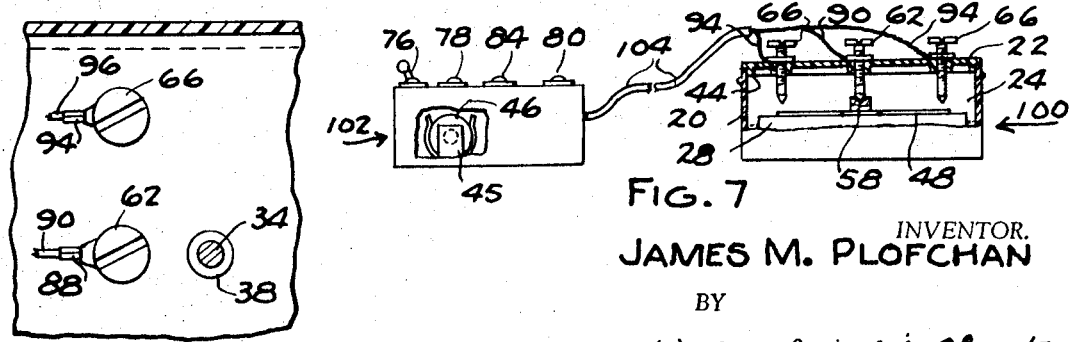
FIG. 6
FIG. 7
INVENTOR.
JAMES M. PLOFCHAN
BY
Barnes, Kisselle, Raisch & Choate
ATTORNEYS

LEVEL INDICATOR DEVICE

This invention relates to level indicator devices and more particularly to an electrical indicator device for use in leveling house trailers, camp trailers and the like.

Objects of this invention are to provide an electric level indicator device (1) to facilitate rapid and easy leveling of house trailers and the like, (2) having comparatively few component parts and hence of economical construction and assembly, and (3) which can be readily and easily installed on a house trailer and the like.

These and other objects, features and advantages of this invention are disclosed in this specification and accompanying drawings in which:

FIG. 4 is a side elevational view partially in section of the indicator device.

FIG. 5 is a sectional view on line 5—5 of FIG. 4 illustrating a float within a float reservoir of the indicator device.

FIG. 6 is a sectional view on line 6—6 of FIG. 4 illustrating a laterally spaced contact of an electrical switch of the indicator device.

FIG. 7 is a side elevational view partially in section of a modified form of the indicator device illustrating a separate control box and a sensing unit electrically connected by a cable.

Figure 1:
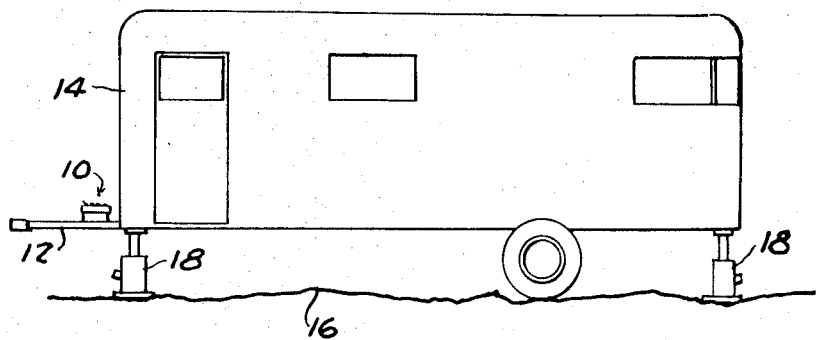
FIG. 1 is a side elevational view of a house trailer with one form of the level indicator device of this invention installed thereon.

FIG. 1 shows level indicator device 10 mounted on a tongue 12 fixed to the frame of a house trailer 14. Trailer 14 is parked on an uneven surface 16 with jacks 18 under each of its four corners to level the floor of the trailer.

As shown in FIG. 4, indicator device 10 includes a generally rectangular reservoir 20 with a cover 22 providing a float chamber 24 containing a liquid 26 such as oil buoyantly supporting a float 28 therein. The bottom wall 29 of reservoir 20 provides both a mounting surface and a reference plane 31 for indicator device 10. In one form of the invention a generally rectangular pan-shaped lid 30 overlies cover 22 and engages the outer periphery of reservoir 20. Cover 22 is retained in a recessed shoulder 32 about the inner periphery of lid 30 by a screw 34. Screw 34 extends through lid 30 and threads into a nut 36 in cover 22. A washer 38 fixed to screw 34 both limits the extent to which it can be threaded into nut 36 and prevents it from falling out of lid 30. Both cover 22 and lid 30 are releasably secured to reservoir 20 in any suitable manner such as by a groove 40 around the inner periphery of lid 30 which snaps into locking engagement with a rib 42 on the outer periphery of reservoir 20. A liquid tight seal between reservoir 20 and cover 22 is provided by an integral depending rib 44 adjacent the outer periphery of cover 22. Preferably, reservoir 20, cover 22 and lid 30 are molded of a weather and oil resistant plastic or plastic-like material. A holder 45 releasably retaining a battery 46 may be secured to cover 22 by a rivet 47.

As shown in FIGS. 4 and 5, float 28 is generally rectangular and has a cross-shaped member 48 formed of electrical conducting material secured to its upper face. The end portions of member 48 provide two sets of perpendicularly related contacts 50, 52 and 54, 56. A contact 58 with a conical-shaped depression 60 is fixed and electrically connected to the center of cross member 48. A screw 62 with a conical tip 64 is adjustably carried by cover 22 and engages in contact 58 to provide both a center pivot axis for float 28 and an electrical connection to contacts 50, 52, 54 and 56. To provide electrical switches four screws 66 (FIGS. 4 and 6) with conical tips 68 are adjustably carried by cover 22 and positioned directly above contacts 50, 52, 54 and 56. Nuts 70 lock both screws 62 and 66 in vertically adjusted position on cover 22. The rotation of float 28 around the longitudinal axis of center screw 62 is limited by bumper blocks 72 on the interior side walls of reservoir 20. A dome or indentation 74 in the bottom of reservoir 20 assures interengagement of tip 64 of center screw 62 with center contact 58. Screws 62 and 66, nuts 70, cross-shaped member 48 and contact 58 are all of an electrically conductive material such as copper.

Figure 2:
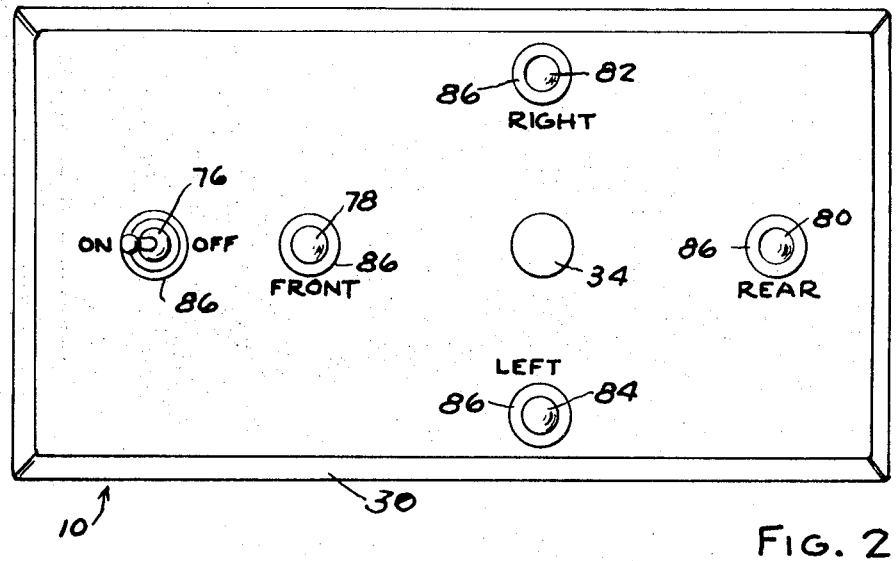
FIG. 2 is a top plan view of the level indicator device illustrating the indicator lights on a control panel.

As shown in FIGS. 2 and 4, a switch 76 and lights 78, 80, 82 and 84 are mounted on the top wall of lid 30 by knurled nuts 86. The top wall of lid 30 provides a control panel with suitable legends identifying each of the lights and positions of the switch as shown in FIG. 2.

Figure 3:
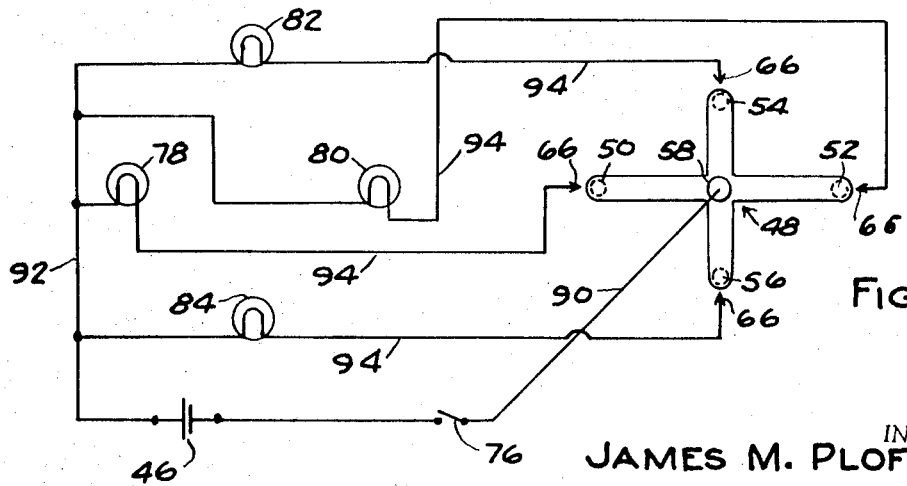
FIG. 3 is a schematic wiring diagram of the electrical components of the indicator device.

As shown in FIGS. 3 and 4, contacts 50, 52, 54 and 56 of cross-shaped member 48 are electrically connected through a washer lug 88, lead 90 and switch 76 to one side of a source of electrical energy such as battery 46. Lights 78, 80, 82 and 84 are each connected through bus 92 to the other side of battery 46 and through leads 94 and lugs 96 to the screw 66 providing an electrical contact positioned over contacts 50, 52, 54 and 56 respectively. Screws 66 are initially adjusted so that there is a slight, substantially equal clearance 98 (FIG. 4) between their tips 68 and associated contacts on member 48 when the reference surface or plane 31 of reservoir 20 is oriented in the position that it will assume when device 10 is mounted on a trailer, the floor or bed of which is disposed in a level horizontal plane. Thus all of the switches or contacts will be open or disengaged whenever reference plane 31 is oriented by movement of reservoir 20 into this predetermined position.

In use level device 10 is mounted on tongue 12 or some other portion of trailer 14 so that the reference plane 31 is parallel to the plane of the floor of trailer 14 and switch 76 is turned to the "ON" position. If the floor of trailer 14 is not level, float 28 will assume a pivoted position about pin 64 wherein one or more screws 66 will engage their respective contacts and complete a circuit between battery 46 and one or more of the lights, thereby indicating that trailer 14 is not level. For example, if trailer 14 is inclined downwardly toward the rear (as viewed in FIG. 1) float 28 will cause contact 52 to engage with its associated screw 66 thereby energizing light 80 which indicates that the trailer is rearwardly inclined. If trailer 14 is inclined downwardly toward the left (as viewed from the rear in FIG. 1) float 28 will cause contact 56 to engage with its associated contact screw 66 thereby energizing light 84 which indicates that the trailer is inclined toward the left. If trailer 14 is inclined downwardly both to the rear and the left, float 28 will cause both contacts 52 and 56 to engage their associated screws 66 and energize both lights 80 and 84. To level the floor of trailer 14 jacks 18 are manipulated to move the corners of the trailer up and down until all of lights 78, 80, 82 and 84 are de-energized. For example, if only rear light 80 is energized, all of the lights can be de-energized and trailer 14 leveled by raising both of jacks 18 at the rear (as viewed in FIG. 1) of trailer 14, and if only left light 84 is energized, all of the lights can be de-energized and trailer 14 leveled by raising both the front and rear jacks on the left-hand side (as viewed in FIG. 1 from the rear of trailer 14) of trailer 14. When indicator device 10 is not being used, switch 76 should be in the "OFF" position to preserve the useful life of battery 46.

The modified arrangement illustrated in FIG. 7 is essentially the same as that described except that the reservoir, float and contact structure, generally designated 100, is separate from a control box or panel 102 with the indicator lights, battery, and on-off switch. The separate control panel and reservoir structure are electrically connected by a flexible multi-wire cable 104. With this modified arrangement reservoir 100 can be located permanently within the trailer and control panel 102 can be manually carried to each of the leveling jacks when the latter are adjusted to level the trailer.

I claim:

1. A liquid level indicator device comprising a housing forming a reservoir adapted to retain a body of liquid, means on said housing forming a reference plane adapted to be positioned on a surface to be leveled, said housing having a top wall, a float within said reservoir having an upper face spaced from and below said top wall when said reference plane is horizontal, said float having a central electrical contact on the top face thereof, a central stud on said top wall projecting into said housing and engaging said central contact to make electrical connection therewith, said central stud cooperating with said contact to form a pivot point about which the float is universally pivotable in response to variations in the inclination of said reference plane, said float also having four electrical contacts thereon spaced from and about said central contact, electrical conductor means extending from each of the latter contacts to said central contact, two of said four contacts lying on a straight line passing through said central contact and the other two of said contacts also lying on a straight line passing through said central contact and perpendicular to said first-mentioned straight line, said top wall also having a plurality of four studs thereon aligned vertically with said four contacts, a series of four indicator bulbs, said central stud being electrically connected in common with each of said bulbs and a source of electrical energy, said four contacts being individually electrically connected, one with each of said four studs, all of said studs being formed of an electrically conductive material whereby when said housing is disposed in a position such that said reference plane is other than horizontal at least one of said four studs makes electrical contact with at least one of said four contacts to establish an electrical circuit through at least one of said indicator bulbs.

2. A level indicator as called for in claim 1 wherein each of said four studs is vertically adjustable on said top wall.

3. A level indicator as called for in claim 1 wherein each of said four studs has a threaded connection with said top wall so that each stud may be adjustable vertically toward and away from its vertically aligned contact on the float.

4. A level indicator as called for in claim 1 wherein said central stud is threaded on said top wall for vertical adjustment.

5. A level indicator as called for in claim 1 including means in said housing for preventing rotation of said float in a generally horizontal plane to a position wherein the four contacts are out of vertical registration with said four studs.

* * * * *